Feb. 24, 1925.

J. A. STEINMETZ 1,527,528

VAULT OR SIDEWALK LIGHT

Filed May 26, 1923

Inventor

Joseph A. Steinmetz

By H. DeWitt Goodwin

Attorney

Patented Feb. 24, 1925.

1,527,528

UNITED STATES PATENT OFFICE.

JOSEPH A. STEINMETZ, OF PHILADELPHIA, PENNSYLVANIA.

VAULT OR SIDEWALK LIGHT.

Application filed May 26, 1923. Serial No. 641,608.

*To all whom it may concern:*

Be it known that I, JOSEPH A. STEINMETZ, a citizen of the United States, residing at Philadelphia, in the county of Philadelphia and State of Pennsylvania, have invented certain new and useful Improvements in a Vault or Sidewalk Light, of which the following is a specification.

My invention relates to improvements in vault lights, or sky-lights, and particularly to those used for sidewalk lights.

The object of my invention is to provide a vault light embodying means for taking care of the difference in expansion and contraction of the various materials used in the construction of vault lights, thus overcoming the breaking of the lenses.

The vault lights now in general use are a constant source of expense due to the cost of replacing of broken lenses. The plastic material in which the lenses are now embedded becomes hard and prevents the lenses from expanding, thus causing them to break. Various materials have been used for embedding the lenses, but they all eventually become hard and non-resilient.

Figure 1:
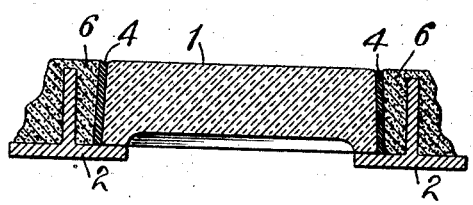
Figure 2:
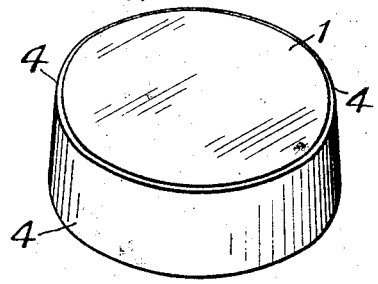
Figure 3:
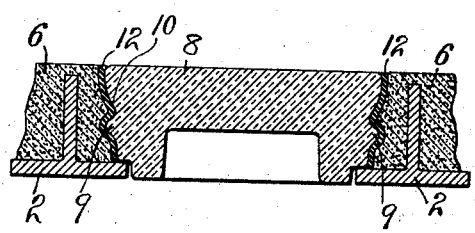
Figure 4:
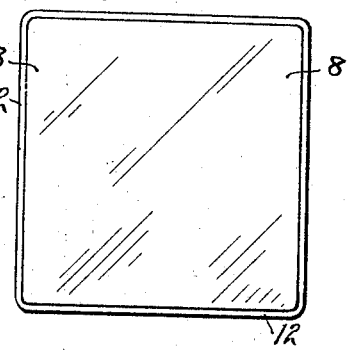
Figure 5:
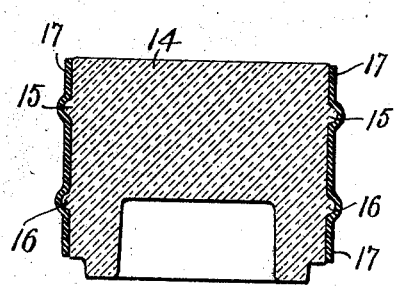
Figure 6:
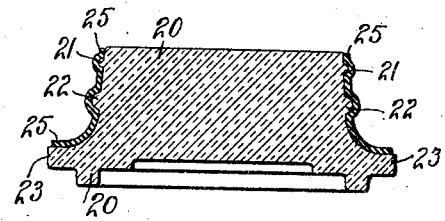

In the accompanying drawing, Fig. 1, is a central vertical sectional view of a lens, shown mounted in a vault light frame and embodying my invention; Fig. 2, is a perspective view of the lens shown in Fig. 1, and the resilient member embracing the lens; Fig. 3, is a central vertical sectional view of a different form of lens, shown mounted in a frame and embodying my invention; Fig. 4, is a plan view of the lens and the resilient embracing member, shown in Fig. 3; Figs. 5 and 6 are sectional views, similar to Fig. 1, showing different forms of lenses and showing the resilient embracing member applied thereto.

Referring to the accompanying drawing, in which like reference characters refer to like parts, 1 represents a lens which is made of transparent, or translucent, material such as glass. 2 represents a frame which may be of any well known construction adapted to form a support for the lenses.

The lens 1 is provided with an elastic or resilient band 4, preferably made of rubber, which band is normally smaller in diameter than the lens so that it will necessarily be stretched and under tension when placed around the periphery of the lens, as shown in Fig. 2. The tightly stretched band 4 will adhere to the glass lens 1 and thus tend to hold the lens against vertical displacement, and also prevent leakage between the lens and the band 4.

The lens 1, having the tightly stretched band 4, embracing it, is placed upon the frame 2 and embedded in plastic material 6 in the usual manner. The band 4 is stretched around the lens and is thus compressed to less than its normal thickness, this allows the plastic material 6 to be packed tightly into the space between the band 4 and the upstanding ribs of the frame 2. The band 4 will not have sufficient resiliency to force the filling 6 away from it, as it is in a compressed state due to being first stretched around the lens. If the band 4 were not under tension it would contract when the filling 6 is being packed into the surrounding space and the natural resiliency of the band 4 would immediately force the plastic filling material away from it before the filling material could harden, and thus leave a space between the filling material 6 and the band 4, which would possibly cause a leak in the vault light.

This trouble is overcome by first placing the resilient band 4 under tension, which causes it to be more compact than the filling material 6 before the latter hardens. A thin layer of resilient material 4 is formed around the lens which permits the lens 1 to expand, or the surrounding filling material 6 to expand, without breaking the lens.

Figs. 3 and 4 illustrate a form of lens 8 having a rib 9 and a groove 10 formed upon its edge walls, and the resilient band 12 conforms tightly to the surface of the edge walls.

Fig. 5, shows a form of lens 14 having side walls with two ribs 15 and 16 thereon and the resilient band 17 is adapted to cover the side walls and the said ribs.

Fig. 6, shows a still different form of lens 20, having ribs 21 and 22, a flange 23, and a resilient band 25 adapted to tightly embrace the side walls of the lens. There are many other forms of lenses now in general use but those illustrated in the drawing will serve to show that the resilient member may be used in connection with any of the various forms.

By using a thin layer of resilient material around the lens, self-hardening material such as cement may be used for the filling material, thus a rigid wall is formed around the lens by the filling material which is adapted to interlock with the inclined walls, or with the ribs, of the lens and lock it securely in the frame. The resilient member is so thin that it cannot be compressed sufficiently to allow the lens to be lifted out of the filling material, but said resilient member is adapted to yield sufficiently to take care of the expansion and contraction of the lens and thus prevent the latter from breaking.

Having thus described my invention I claim and desire to secure by Letters Patent:

1. A vault or sidewalk light comprising, a frame, a lens positioned upon the frame, a band of resilient material of smaller diameter than the lens adapted to be stretched around the perimeter of the lens, and a filling of self-hardening material surrounding the lens and said band adapted to hold said lens with said band thereon interlocked in the frame.

2. The method of securing a lens in a frame forming a vault or sidewalk light consisting of tightly stretching a resilient band around the perimeter of the lens, then surrounding the lens with said band thereon in self-hardening material, said band being first stretched sufficiently so that it will not force the self-hardening material away from it before said material hardens.

In testimony whereof I affix my signature.

JOSEPH A. STEINMETZ.